Patented Feb. 4, 1930

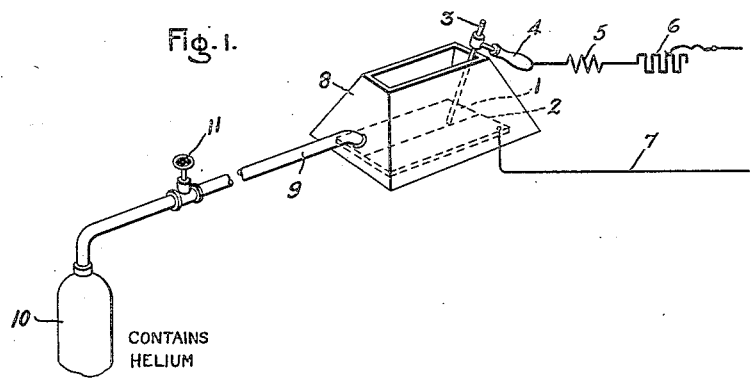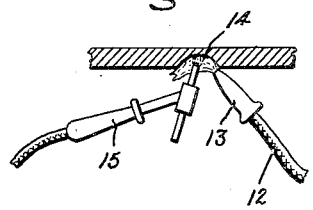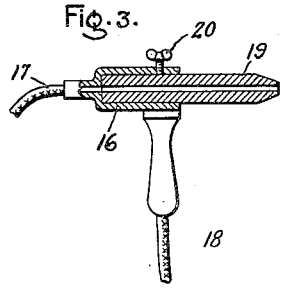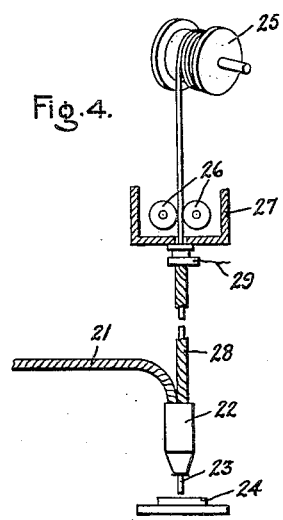

1,746,081

UNITED STATES PATENT OFFICE

HENRY M. HOBART, OF NISKAYUNA, NEW YORK, ASSIGNOR TO GENERAL ELECTRIC COMPANY, A CORPORATION OF NEW YORK

ARC WELDING

Application filed June 29, 1926. Serial No. 119,419.

My invention relates to electric arc welding in a gaseous medium and more particularly in helium and has as an object the production of sound ductile welds.

Welds made in the open air by the electric arc process are characterized by brittleness or lack of ductility. It has been proposed to surround the arc and blanket the molten portions of the work with nitrogen, to improve the quality of the welds, but welds so made are generally found to be no more ductile than welds made in air which contains 80% of nitrogen. In fact, ferrous welds made in a container or housing into which is passed a great excess of dry nitrogen of highest commercial purity are found in eight cases out of ten to be as brittle, or more brittle than welds made in air.

It is now generally recognized that one of the principal causes of brittleness is the presence of nitrides and oxides in the weld metal. I have discovered that brittle welds may be avoided by excluding from the weld metal oxygen and nitrogen or other deleterious substances which will yield oxygen and nitrogen in the presence of the arc by enveloping the arc and molten portions of the work with an absolutely inactive medium, such as helium.

The striking voltage with a bare metallic electrode, that is, the minimum voltage necessary to start and maintain the arc, in an atmosphere of helium is about 40 volts. The arc voltage or voltage consumed in such an arc is about 18 volts, or about the same as that for an arc in air.

As helium is lighter than air, overhead welding can be accomplished by directing a jet of the gas about the arc and the work to exclude air and eliminate the formation of oxides and nitrides so detrimental to the weld. As the gas is incombustible as well as transparent, the operation can be readily conducted without inconvenience to the operator. Welding in confined places where inflammable media would present difficulties is likewise facilitated by the use of such an inactive gas. For welding on horizontal or inclined surfaces the same process may be applied or a hood or box surrounding the arc and molten portions of the weld metal may be used to advantage. The gas may also be supplied to the point of welding through a hollow electrode.

My invention is applicable to metallic arc welding as well as carbon arc welding. It is of particular value in carbon arc welding since with the longer arc used in this form of welding greater harm may be done to the weld metal by the presence of oxygen and nitrogen than where shorter arcs are used as in metallic arc welding. As in the case of arc welding in air my invention may be used for manual, semi-automatic or full automatic arc welding.

My invention will be better understood from the following description when considered in connection with the accompanying drawing and its scope will be pointed out in the appended claims.

In the drawing, Fig. 1 diagrammatically represents my invention as applied to manual arc welding, a hood being used to enclose the work and the arc; Fig. 2 represents another application of my invention in which independent means are used to supply the gaseous medium about the arc and molten portions of the metal; Fig. 3 shows another method of manual welding in which the gas is supplied through an opening running down through the axis of the electrode; and Fig. 4 diagrammatically represents my invention as applied to semi-automatic or full automatic arc welding.

In Fig. 1 the work is shown as a pair of plates 1 and 2 and the electrode 3 is indicated as held by a suitable holder 4 adapted to be manipulated to cause the arc to be established or maintained between the electrode and the work during the welding operation. The electrode which may be either a metallic or carbon electrode is connected to a supply circuit through a reactor 5 and a resistor 6. A lead 7 is shown for connecting the work to the other side of the supply circuit. In order to simplify the drawing the source is not shown but it may be a constant potential source where a series stabilizing resistor, such as 6, is used. The source may be, however, an inherently regulated generator which may supply the arc without the use of a stabilizing resistor. A hood 8 of suitable material, such as asbestos, is shown as covering the work. It may be comparatively small and cover but a portion of the work. The hood has an open top which is only sufficiently large to permit the operator to manipulate the electrode readily. The hood may be of metal and provided with a cover of asbestos or the like having an opening therein. The gaseous medium is conducted to the hood through a conduit 9 from a container 10. A valve 11 is provided for controlling the supply of gas to the hood 8. A sufficient amount of helium is supplied to the hood effectively to exclude the presence of deleterious gases.

In Fig. 2 the helium gas is supplied from a suitable source, not shown, through a suitable conduit 12 to a nozzle 13, by which it is directed about the arc and molten portions of the weld metal at 14. A conventional form of the electrode holder with electrode is shown at 15. In Fig. 2 the invention is shown as applied to overhead welding but the same apparatus could be used for performing a welding operation according to the invention in any position. Similarly, the hood shown in Fig. 1 could be used for overhead welding in place of the apparatus shown in Fig. 2.

In Fig. 3 the apparatus shown in Fig. 2 has been combined into a unitary structure by providing a hollow electrode and a suitable holder for the same. In the arrangement shown, the gaseous medium is supplied to the holder 16 through a flexible tube 17 and the welding current is conducted to the electrode by a lead 18. The hollow electrode 19 is secured in the electrode holder 16 by any suitable means such as the hand screw shown at 20. The electrode 19 may be of metal or of carbon.

In Fig. 4 I have illustrated my invention as applied to automatic or semi-automatic arc welding. In the arrangement shown, helium is supplied from a suitable source, not shown, through a flexible conduit 21 to a welding tool 22 from which it is discharged about the welding electrode 23 and the molten portions of the work 24. In this figure the electrode 23 is indicated as being drawn from a reel 25 by feed rollers 26 driven by any suitable means. The feed rollers are mounted in a suitable welding head 27. The electrode is delivered from the rolls 26 to the tool 22 by a flexible conduit 28. Welding current is supplied at 29 from any suitable source.

Although I have shown and described several means that may be employed in applying my process of welding it is to be understood that any suitable means may be employed. It is also to be understood that my invention embraces welding in a gaseous medium comprising helium and will not be departed from by the admixture of other gases either as harmless diluents or to secure added results.

What I claim as new and desire to secure by Letters Patent of the United States, is:

1. The method of welding by the electric arc process which comprises maintaining an arc and blanketing the molten portions of the work during the welding operation with a gaseous medium comprising helium.

2. The method of welding by the electric arc process which comprises maintaining an arc and directing a stream of helium to envelop the arc and molten portions of the work during the welding operation.

3. The method of fusing metals by the electric arc process which comprises maintaining an arc and supplying helium to surround the arc and molten portion of the metals.

In witness whereof, I have hereunto set my hand this 28th day of June, 1926.

HENRY M. HOBART.